United States Patent
Mukherjee et al.

(10) Patent No.: US 9,880,676 B1
(45) Date of Patent: Jan. 30, 2018

(54) FORCE SENSITIVE CAPACITIVE SENSORS AND APPLICATIONS THEREOF

(71) Applicant: Amazon Technologies, Inc., Reno, NV (US)

(72) Inventors: Debanjan Mukherjee, San Jose, CA (US); Lakshman Rathnam, Mountain View, CA (US); Omar Sze Leung, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/297,443

(22) Filed: Jun. 5, 2014

(51) Int. Cl.
*G06F 3/041* (2006.01)
*G06F 3/044* (2006.01)

(52) U.S. Cl.
CPC .................... *G06F 3/044* (2013.01)

(58) Field of Classification Search
CPC .............. G06F 3/044; G06F 3/0414; G06F 2203/04105; G06F 2203/04106; G06F 2203/04107; G06F 1/1652; G06F 3/047; G06F 3/041; G06F 3/045
See application file for complete search history.

(56) References Cited

U.S. PATENT DOCUMENTS

| | | | | |
|---|---|---|---|---|
| 2010/0102830 A1* | 4/2010 | Curtis | ................... | G06F 3/0414 324/661 |
| 2011/0115738 A1* | 5/2011 | Suzuki | ................... | G01L 1/205 345/173 |
| 2012/0038583 A1* | 2/2012 | Westhues | .............. | G06F 3/0412 345/174 |
| 2013/0033450 A1* | 2/2013 | Coulson | .................. | G06F 3/044 345/174 |
| 2013/0076375 A1* | 3/2013 | Hanumanthaiah | ... | H03K 17/962 324/661 |
| 2013/0126325 A1* | 5/2013 | Curtis | ................ | H03K 17/9622 200/5 A |
| 2013/0234734 A1* | 9/2013 | Lida | ........................ | G06F 3/044 324/661 |
| 2014/0198060 A1* | 7/2014 | Wu | ........................ | G06F 3/0412 345/173 |
| 2014/0267152 A1* | 9/2014 | Curtis | .................... | G06F 3/0414 345/174 |
| 2014/0333579 A1* | 11/2014 | Sleeman | ................. | G01L 1/146 345/174 |
| 2015/0324056 A1* | 11/2015 | Sato | ...................... | G06F 3/0416 345/174 |

* cited by examiner

*Primary Examiner* — Ilana Spar
*Assistant Examiner* — Nguyen H Truong
(74) *Attorney, Agent, or Firm* — Lee & Hayes, PLLC

(57) ABSTRACT

Electronic devices may include force sensitive sensors. The sensor may include a first layer of electrodes, a second layer of electrodes and a deformable dielectric material separating the first layer of electrodes and the second layer of electrodes. A conductive material may be disposed to negate capacitive effects between an object near to or touching the touch surface and the electrodes of the first layer and the electrodes of the second layer. A force applied to the sensor may be detected based at least in part on a change in capacitance between at least one electrode of first layer and at least one electrode of the second layer resulting from deformation of the deformable dielectric material. This disclosure also describes techniques for assembling electronic devices including these components.

20 Claims, 9 Drawing Sheets

300

CAPACTIVE TOUCH SENSOR AREA WITH NON-DEFORMABLE DIELECTRIC MATERIAL 324

PLACE THE FIRST SUBSTRATE ADJACENT TO THE SECOND SUBSTRATE SO THAT DEFORMABLE DIELECTRIC AND NON-DEFORMABLE DIELECTRIC LAYERS PROVIDE SEPARATION BETWEEN THE ELECTRODES OF THE SUBSTRATES
322

FORCE SENSITIVE SENSOR AREA WITH DEFORMABLE DIELECTRIC MATERIAL 326

FORCE SENSITIVE CAPACITIVE SENSORS AND APPLICATIONS THEREOF

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
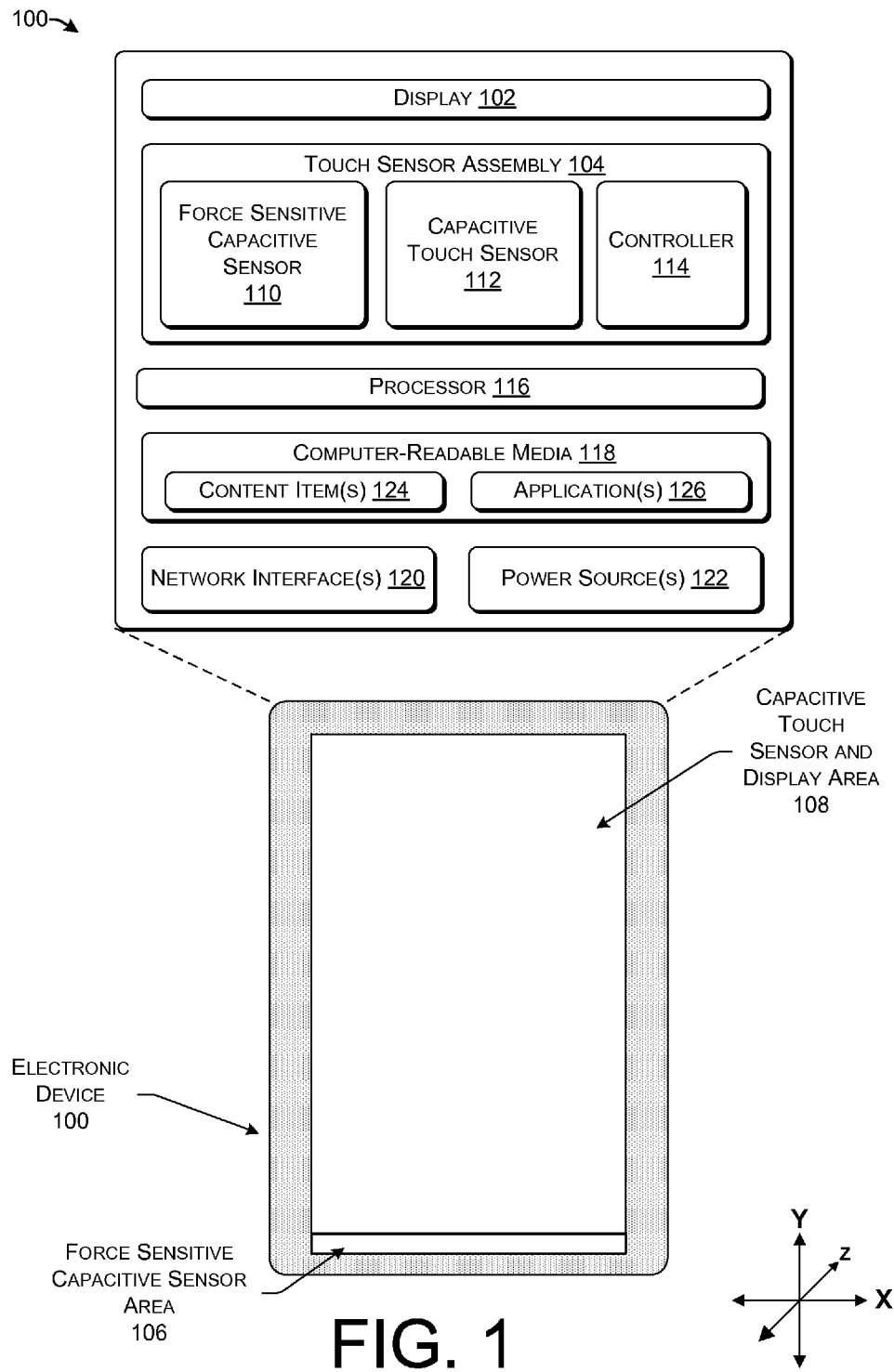
FIG. 1 illustrates an example electronic device equipped with a capacitive touch sensor and a force sensitive capacitive sensor according to an embodiment of the present invention.

This disclosure describes, in part, electronic devices that include force sensitive capacitive sensors including a deformable dielectric layer between the electrodes of the sensor. In some implementations, the deformable dielectric layer deforms (e.g., compresses and/or expands) when force is applied to the sensor by touches. The force sensitive capacitive sensors may operate by detecting changes in capacitance between the electrodes due to the deforming (e.g., compression and/or expansion) of the deformable dielectric layer as the distance between the electrodes vary.

In some implementations, the electronic devices according to this disclosure may include a conductive layer or other application of materials over the sensor to shield the sensor from proximity effects that would otherwise be detected from objects such as the fingers of users. Proximity effects include, for example, changes in mutual capacitance between intersecting electrodes of a capacitive touch sensor due to proximity of an object (e.g., a human finger) to the capacitive touch sensor or the touch of the object to a capacitive touch sensor. As used herein, a sensor is shielded from proximity effects of the object by the presence of the conductive layer between the object and the touch sensor such that changes in capacitance do not occur or are minimized due to the presence of the object in proximity or in contact with the sensor (assuming a low or zero force contact). For example, when a layer of conductive material is placed between a capacitance touch sensor and finger or other conductive object, the capacitance touch sensor will not detect the finger or other conductive object on the other side of the layer of conductive material. Some devices according to this disclosure may include one or more force sensitive capacitive touch sensors around the periphery of a display device. In some such implementations, the display device may be behind a conventional capacitive touch sensor that operates based on both proximity effects and surface touches.

Further, in some implementations, the conventional touch sensor and the force sensitive capacitive sensor(s) may be formed in the same layer of the stack of the electronic device. For example, they may be formed on the same substrate. The conductive material may then be formed over the force sensitive capacitive sensor. Thereby, an electronic device may be provided which has the ability to detect both force sensitive input and conventional capacitive touch input.

In some implementations, a stack may include a plurality of layers of a device. For example, in some implementations, a stack may be a layered construction including a display as well as other items such as sensor(s), optically clear adhesives, a cover layer, and so on. The display may be or may include devices such as an LCD display or an OLED display. In some embodiments, the device may also include a liquid crystal display panel, a ground plane, the light source, and so on.

In other implementations, a ground plane of a display or other portion or component of the electronic device may serve to shield the sensor from proximity effects. A ground plane may comprise a large area of copper foil disposed on a component that is connected to a ground terminal and serves as a return path for current from different components of the display. In some implementations, the force sensitive capacitive sensor may be placed behind a flexible display component. In such implementations, the flexible display component may include a ground plane that serves to electrically shield the force sensitive capacitive sensor from proximity effects in the same way as the layer of conductive material discussed above. This disclosure also describes techniques for assembling electronic devices including these component stacks.

In some implementations, a capacitive sensor may include several other components of an electronic device. Some or all of these components may receive power input from a controller or other component of the electronic device. The output of the capacitive sensor can be "read" by the controller. In some embodiments, some parts of the sensor are pulsed or supplied with electric current and other parts of the sensor are scanned to detect changes in capacitance between the scanned parts and the pulsed parts. The capacitive touch sensor may also include a separation layer situated between the parts of the sensor that receive power input (i.e. are pulsed) and the parts of the sensor that are read by the touch controller (i.e. are scanned for changes in capacitance). For example, in some implementations, a capacitive sensor may include two layers of electrodes, the substrate(s) upon which the electrodes are formed and the dielectric layer separating the two layers of electrodes. The electrodes of the two layers may be arranged to intersect in the plane of the sensor (i.e. the layers of electrodes may be situated such that the electrodes of the layers are parallel within the individual layers but not parallel to electrodes in the other layer). At the same time, the dielectric layer between the layers of electrodes provides a vertical separation to prevent contact between electrodes of the different layers.

FIG. 1 illustrates an example electronic device 100 that includes the touch sensor assembly introduced above. The device 100 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In addition, while FIG. 1 illustrates several example components of the electronic device 100, it is to be appreciated that the device 100 may also include other conventional components, such as an operating system, system busses, input/output components, and the like.

Regardless of the specific implementation of the electronic device 100, the device 100 includes a display 102 and a touch sensor assembly 104. In some implementations, the display 102 and touch sensor assembly 104 may be laid out as illustrated with the touch input and display functions of the electronic device being divided into two areas in the X-Y plane of the display stack include the corresponding portions of the display stack. Specifically, the illustrated implementation includes a force sensitive capacitive touch sensor area 106 of the display stack and a capacitive touch sensor and display area 108 of the display stack. More particularly, area 108 covers most of the face of the device, is centrally located and includes the portions of the display stack layers below the face of the device which are within the indicated area. On the other hand, the area 106 is located at a periphery of the area 108 and includes the portions of the layers of the display stack below the indicated area of the face of the device. However, though the area 106 is shown only at the bottom of the device in the illustrated orientation, in other implementations, the area 106 (and its respective components) may be more encompassing. For example, the area 106 may extend all the way around the area 108, extend around one or more sides or portions of the sides of the area 108, or be encompassed within the area 108. Other variations would be apparent in view of this description.

As the name suggests, the portion of the stack corresponding to the force sensitive capacitive sensor area 106 includes a force sensitive capacitive sensor 110. Similarly, the portion of the stack corresponding to the capacitive touch sensor and display area 108 includes a capacitive touch sensor 112 and the display 102. As discussed above, in some implementations, the force sensitive capacitive sensor 110 and the capacitive touch sensor 112 may be in the same layer of the display stack or may be located in separate layers. For example, in some implementations, the sensors 110 and 112 may share substrates (e.g., one or more of the substrates the electrodes are placed on may be the same for both sensors). However, this is not limiting and, in some implementations, the sensors 110 and 112 may be in the same layer and not share a substrate (i.e., the substrate of the touch sensing portion may not extend into the force sensing area) or the sensors may be located on different layers. Further, implementations are not limited to the relative layout of FIG. 1. For example, in some implementations, the sensors 110 and 112 may be reversed in position and size.

In some instances, the capacitive touch sensor 112 may reside atop the display 102 to form a touch-sensitive display (e.g., an LCD touch-sensitive display) that is capable of both accepting user input and rendering content corresponding to the input.

Though a capacitive touch sensor 112 is illustrated and described in relation to FIG. 1, other implementations may include other types of touch sensor in place of the capacitive touch sensor 112 such as a force sensitive resistance (FSR), an interpolating force sensitive resistance (IFSR) sensor, or any other type of touch sensor. In some instances, the touch sensor 112 is capable of detecting touches as well as determining an amount of pressure or force of these touches.

The touch sensor assembly 104 may further include one or more touch controllers 114. In some implementations, the touch controller 114 may operate both the force sensitive capacitive sensor 110 and the capacitive touch sensor 112. For example, a shared controller may be coupled to and configured to pulse and scan the electrodes of both sensors 110 and 112. In other implementations, the touch sensors 110 and 112 may each have one or more respective controllers.

The display 102 may be an emissive display (e.g., a backlit LCD, a LED LCD display, an OLED display or the like). Alternatively, the display 102 represents a reflective display, such as an electronic paper display, a reflective LCD display or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one implementation, the display 102 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display 102 comprises an electrophoretic display that includes oppositely charged light and dark particles. In order to create white, a display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller may utilize different arrays of both light and dark particles.

Of course, while two different examples have been given, it is to be appreciated that the displays described herein may comprise any other type of electronic-paper technology or reflective-display technology, such as gyricon displays, electrowetting displays, electrofluidic displays, interferometric modulator displays, cholestric liquid crystal displays, and the like. In addition, while some of the examples described above are discussed as rendering black, white, and varying shades of gray, it is to be appreciated that the described techniques apply equally to reflective displays capable of rendering color pixels. As such, the terms "white", "gray", and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter.

FIG. 1 further illustrates that the electronic device includes one or more processors 116 and computer-readable media 118, one or more network interfaces 120 and one or more power sources 122. The network interfaces 120 may support both wired and wireless connection to various networks, such as cellular networks, radio, WiFi networks, short range networks (e.g., Bluetooth), IR, and so forth.

Depending on the configuration of the electronic device 100, the computer-readable media 118 (and other computer-readable media described throughout) is an example of computer storage media and may include volatile and non-volatile memory. Thus, the computer-readable media 118 may include, but is not limited to, RAM, ROM, EEPROM, flash memory, or other memory technology, or any other medium which can be used to store media items or applications and data which can be accessed by the electronic device 100.

The computer-readable media 118 may be used to store any number of functional components that are executable on the processors 116, as well content items 124 and applications 126. Thus, the computer-readable media 118 may include an operating system and a storage database to store one or more content items, such as eBooks, audio books, songs, videos, still images, and the like. The computer-readable media 118 of the electronic device 100 may also store one or more content presentation applications to render content items on the device 100. These content presentation applications may be implemented as various applications depending upon the content items. For instance, the application may be an electronic book reader application for rending textual electronic books, an audio player for playing audio books or songs, a video player for playing video, and so forth.

While FIG. 1 illustrates a few example components, the electronic device 100 may have additional features or functionality. For example, the device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 100 may reside remotely from the device 100 in some implementations. In these implementations, the device 100 may utilize the network interfaces 120 to communicate with and utilize this functionality.

Figure 2:
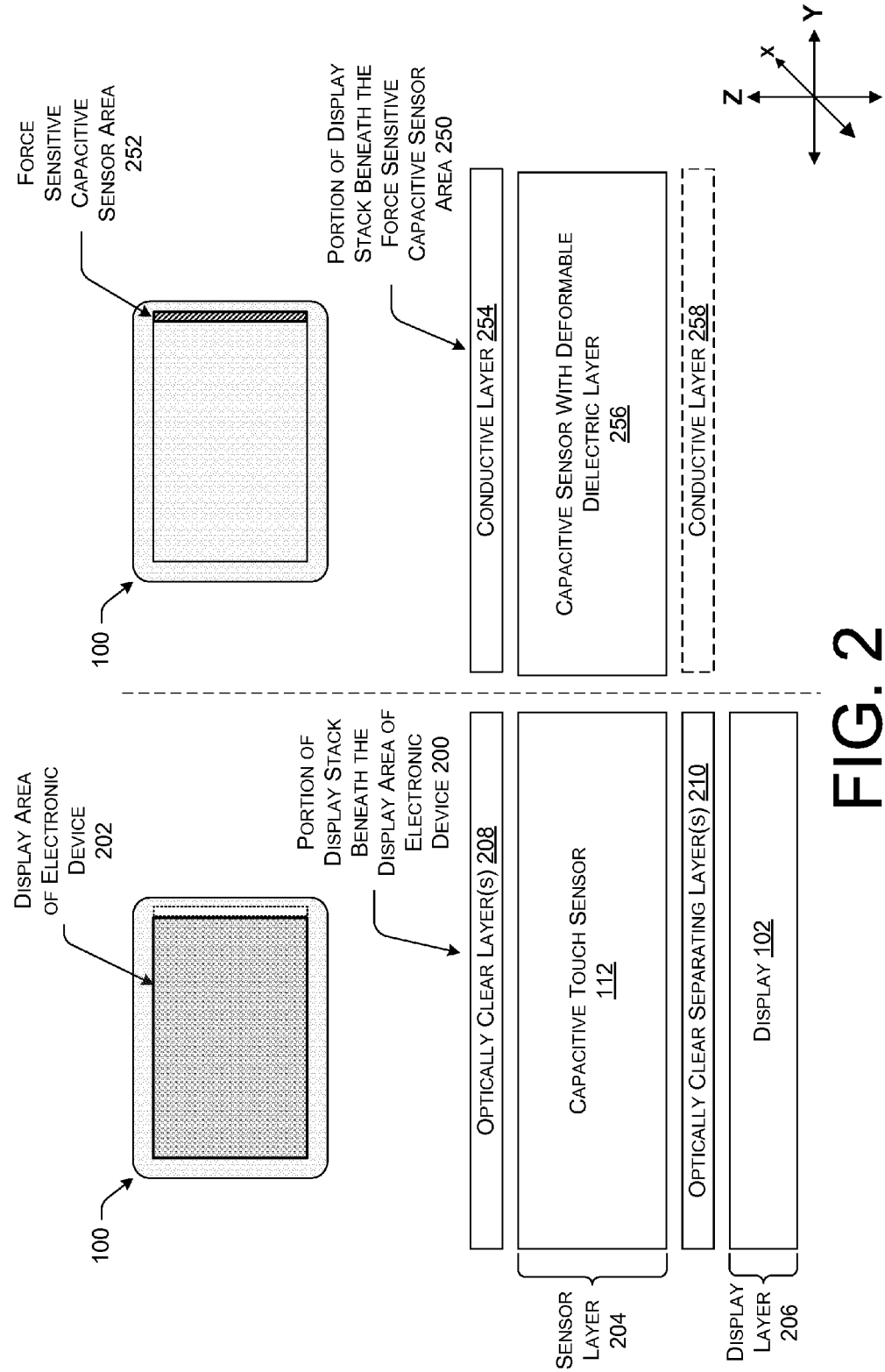
FIG. 2 illustrates an example schematic cross-section of a portion of a stack of the electronic device of FIG. 1 according to an embodiment of the present invention.

FIG. 2 illustrates an example schematic cross-section of the portion 200 of the stack beneath the display area 202 and the portion 250 of the stack beneath the force sensitive capacitive sensor area 252 of the electronic device 100 of FIG. 1. In the illustrated example implementation, the portion 200 of the stack beneath the display area 202 includes the capacitive touch sensor 112 in a sensor layer 204, a display 102 in a display layer 206, one or more optically clear layer(s) 208 and one or more optically clear separating layer(s) 210. Of course, in some implementations each illustrated layer may include one or more components.

As mentioned above, the cross-section 200 illustrates one implementation in which one or more optically clear layer(s) 208 reside atop the capacitive touch sensor 112 of the sensor layer 204, which resides atop one or more optically clear separating layer(s) 210, which in turn reside atop the display 102 of the display layer 206.

In the illustrated example, the one or more optically clear layers 208 may include one or more of: optically clear adhesives (e.g., solid OCA, LOCA, etc.), an antiglare film, PMMA, and/or any other layer that a designer of the electronic device 100 may desire above the capacitive touch sensor 112. For example, in the illustrated implementation, the layer 208 may include a layer of OCA atop the capacitive touch sensor 112 to adhere an anti-glare film to the stack. Similarly, the one or more optically clear separating layer(s) 210 may also include one or more of: optically clear adhesives (e.g., solid OCA, LOCA, etc.), PMMA, and/or any other layer that a designer of the electronic device 100 may desire between the sensor layer 204 and the display layer 206.

As mentioned above, FIG. 2 further illustrates the portion of display stack beneath the force sensitive capacitive sensor area 252 of the electronic device 100 of FIG. 1. The illustrated example implementation includes (a conductive layer 254 that is adhered to or otherwise resides above a force sensitive capacitive sensor with a deformable dielectric layer 256. The force sensitive capacitive sensor with a deformable dielectric layer 256 is illustrated to reside within the sensor layer 204 of the stack of the electronic device (i.e., at a same depth within the stack).

In some implementations, a conductive layer 254 may reside atop a force sensitive capacitive sensor with a deformable dielectric layer 256. The conductive layer 254 may include, for example, a black mask that includes the conductive elements. As mentioned above, the conductivity of the conductive layer 254 may operate to shield against proximity effects from objects touching or positioned above the force sensitive capacitive sensor with a deformable dielectric layer 256. Further, in some implementations, the force sensitive capacitive sensor with a deformable dielectric layer 256 may reside atop another conductive layer 258. For example, depending on the implementation, such a conductive layer 258 may act to shield against proximity effects from the bottom of the sensor 256. In some example implementations, the electric field effects from the operation of the device or proximity effects from a user may cause false or incorrect force sensor readings if not properly shielded. In these and other scenarios, the shielding may be provided by including a conductive layer 258 on the bottom of the force sensitive capacitive sensor with a deformable dielectric layer 256

Moreover, though not shown, implementations may include one or more optically clear layer(s) that may reside above or be combined with the conductive layer 254 and one or more optically clear separating layer(s) below or combined with the conductive layer 258, which in turn may reside atop a display. In some instances, the one or more optically clear layers and one or more optically clear separating layer(s) may be the same or similar types of layers as the previously described for the one or more optically clear layers 208 and one or more optically clear separating layer(s) 210. For example, an optically clear layer comprised of an antiglare film may cover the force sensitive capacitive sensor area 252 and the display area 202 as a single layer of film.

FIGS. 3A-3D illustrate an example process for assembly of the sensor layer 204 that includes both the capacitive touch sensor 112 and the capacitive sensor with deformable dielectric layer 256. More particularly, FIGS. 3A-3D illustrate an implementation in which the sensors 112 and 256 share the substrates upon which the sensors 112 and 256 are formed.

At 302, two sets of column electrodes 304A and 304B are formed on the surface of a first substrate 306. Electrodes 304A are formed in a portion 336 of substrate 306 and electrodes 304B are formed in portion 338 of substrate 306. In an embodiment, electrodes 304A may be part of the capacitive touch sensor 112 and electrodes 304B may be part of force sensitive capacitive sensor with deformable dielectric layer 256. As illustrated, electrodes 304A and 304B may be arranged in columns on the first substrate 306. However, this is not a limitation and the electrodes 304A and/or 304B may be arranged in rows instead of columns. Further, the electrodes 304A and/or 304B are shown to be parallel to each other in FIG. 3, however, in some instances, they may be formed to have any other orientation with respect to electrodes in other sets electrodes. While substrate 306 is illustrated as including two sets of electrodes 304A and/or 304B, in some implementations, column electrodes a single set of electrodes may extend between both portions 336 and 338 of substrate 306. In this implementation, capacitive touch sensor 112 and force sensitive capacitive sensor with deformable dielectric layer 256 may share the single set of column electrodes.

At 308, two sets of row electrodes 310A and 310B are formed on the surface of a second substrate 312. Electrodes 310A are formed in a portion 340 of substrate 312 and electrodes 310B are formed in portion 342 of substrate 312. Each set of electrodes 310A and 310B may correspond to one of these sensors 112 and 256, respectively. As with the electrodes 304 of the first substrate 306, the electrodes 310 formed on the second substrate 312 may be formed at an angle other than as row electrodes. As with the electrodes 304A and/or 304B, in some instances, the two sets of electrodes 310A and 310B may be separated from each other. The distance of separation between the two sets of electrodes may be greater than the distance between individual electrodes in either set. However, this is not a limitation. In some instances, the two sets of electrodes may be uniformly distributed over the surface. For example, the spacing of electrodes 310 across the substrate 312 may be uniform or substantially uniform, without the extra distance separating the electrodes 310 corresponding to the touch sensor 112 from the electrodes 310 corresponding to the sensor 256.

In some embodiments, spacing of electrodes 304A and/or 304B may substantially uniform over the surface of substrate 306. In other embodiments, spacing of electrodes 304 and/or 350 may be non-uniform across the surface of substrate 306. In some embodiments, the number of electrodes in a particular set of electrodes (e.g., 304A) may be more than number of electrodes in the other set of electrodes (e.g., 304B).

In some implementations, the substrates and electrodes may comprise any conventional and/or yet to be known substrate or electrode material(s). For example, the first substrate may comprise a flexible optically clear material, such as PMMA. The electrodes may be formed of Indium Tin Oxide (ITO) or other suitable conductive material.

Figure 3A:
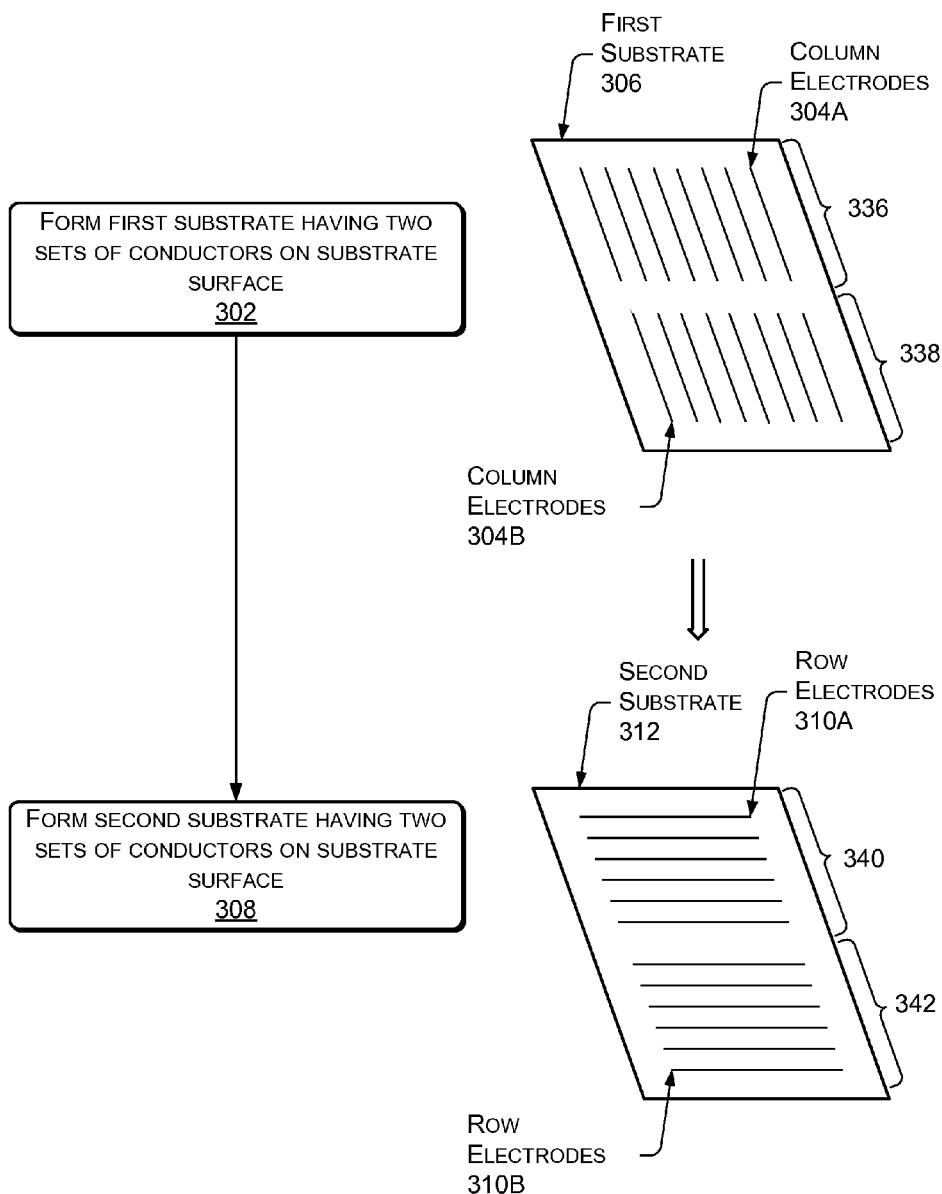
FIGS. 3A-3D illustrates an example construction and process therefore for the touch sensors of the electronic device of FIG. 1 according to an embodiment of the present invention.
Figure 3B:
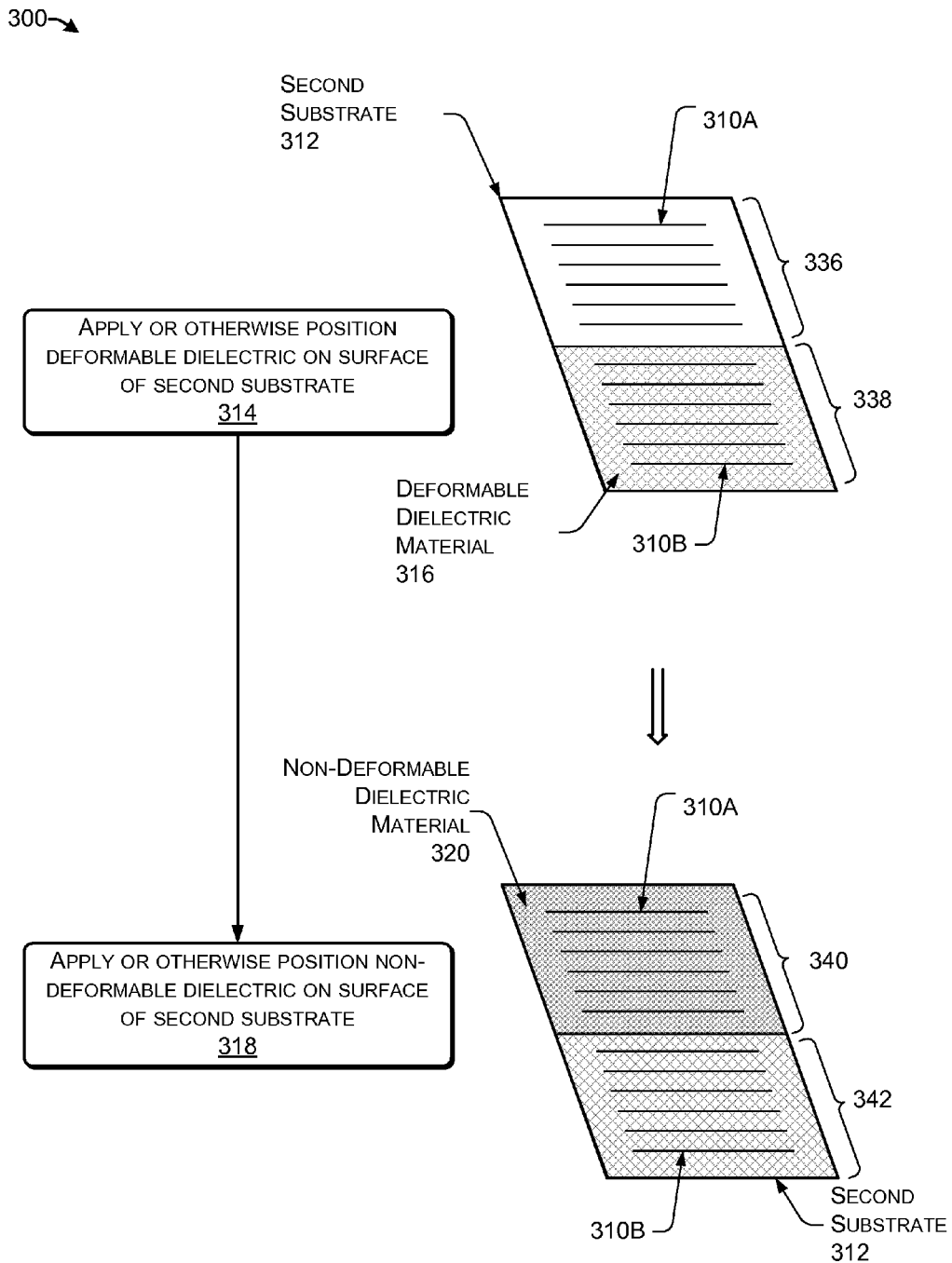

Turning to FIG. 3B, at 314, a deformable dielectric material 316 may be applied, formed, or otherwise positioned over the region 338 on the surface of the second substrate 312. In this example, consider that electrodes 310B will be part of the force sensitive capacitive sensor 256 and electrodes 310A will be part of the capacitive touch sensor 112. Thus, in this example, the deformable dielectric material 316 may be placed/formed over and/or joined to the electrodes 310B. The deformable dielectric material 316 compresses when a force is applied to the material 316 and returns back to its original form when the applied force is removed from the material 316. As an example, the deformable dielectric material 316 may include a material such as silicone rubber, urethane, polyurethane, polyethylene, acrylic, open cell, closed cell or semi-closed cell foam or silicone sponge. In the case of a foam, the cell size of the foam may be 100-200 µm in some implementations. Further, in some implementations, the deformable dielectric material may be 0.1-1.0 mm thick. However, any other suitable deformable dielectric material or thickness may be used.

At 318, a non-deformable dielectric material 320 is applied, formed, or otherwise positioned over a region 340 on the surface of the second substrate 312. In particular, the non-deformable dielectric material 320 may be placed/formed over and/or joined to the electrodes 310A that are to be included within the capacitive touch sensor 112. As the name suggests, the non-deformable dielectric material 320 does not deform (e.g., compress and expand) as force is applied to or removed from the material 320. As an example, the non-deformable dielectric material 320 may be a material such as glass or a non-deformable, optically clear film. However, any other suitable non-deformable dielectric material may be used.

Figure 3C:
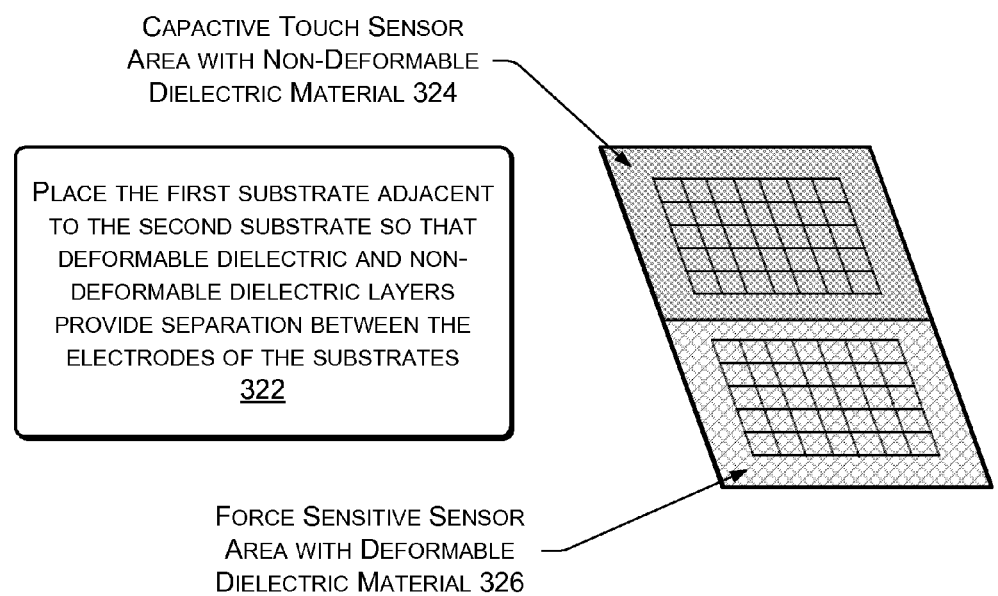

Turning to FIG. 3C, at 322, the first substrate 306 is placed on top of the substrate 312 such that the deformable dielectric material 316 and non-deformable dielectric material 320 provide separation between the electrodes formed on the respective substrates 306 and 312. As such, a capacitive touch sensor area with a non-deformable dielectric material is formed as indicated at 324 and a force sensitive sensor area with a deformable dielectric material is formed as indicated at 326.

Figure 3D:
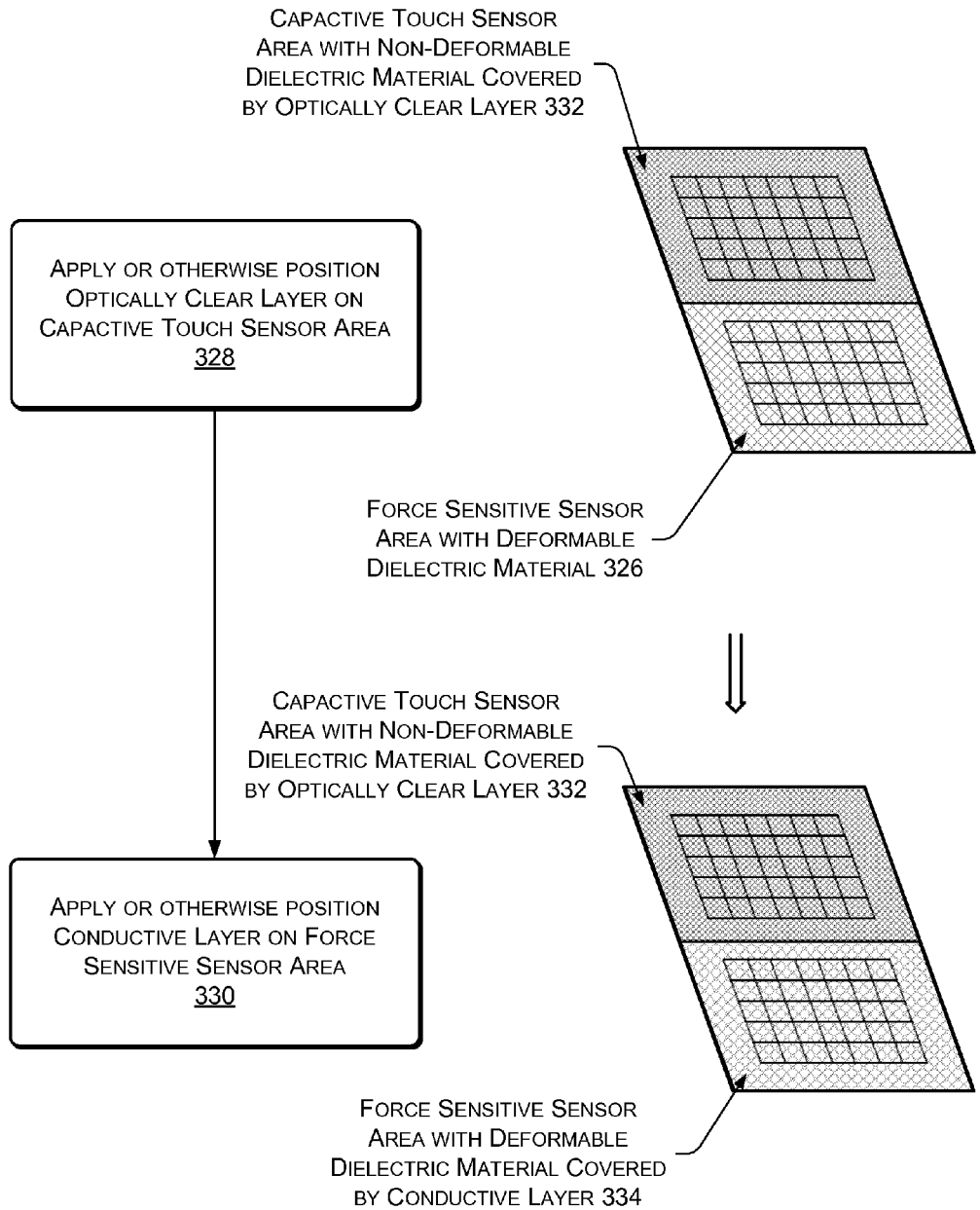

Turning to FIG. 3D, at 328, an optically clear layer is applied or otherwise positioned over the capacitive touch sensor area (e.g., on the top surface of the first substrate 306). Likewise, at 330, a conductive layer, such as a black mask with conductive elements, is applied or otherwise positioned on the force sensitive sensor area. At 330, a capacitive touch sensor area has been formed at 332 that includes a non-deformable dielectric material and that is covered by the optically clear layer. Similarly, a force sensitive sensor area has been formed at 334 that includes a deformable dielectric material and that is covered by a conductive layer. The capacitive touch sensor area 332 may operate as a conventional mutual capacitance touch sensor to provide both touch sensing and proximity effect sensing. On the other hand, the force sensitive sensor area 334 may operate, for example, as a force sensor by determining changes in mutual capacitance between intersecting electrodes as the deformable dielectric material compresses and/or expands from force applied by touches.

As would be understood by one of ordinary skill in the art, the process for construction of the touch sensor layer 204 are shown in FIGS. 3A-3D is not exhaustive as to the components shown nor the only way of constructing such a touch sensor layer. For example, depending on the particular materials involved, optically clear adhesive (OCA) may be applied between the various layers is shown in FIGS. 3A-3D. For example, a layer of OCA may be applied between the optically clear layer and the top surface of the first substrate as well as between the conductive layer and the first substrate. Numerous other variations would be apparent in view of this disclosure. Of course, though the capacitive touch sensor and a force sensitive capacitive sensor are shown and described as being in the same layer of the display stack of the devices illustrated herein, this is not a requirement and the illustrated force sensitive capacitive sensors may be implemented standalone devices or placed in other layers of electronic device stacks.

Figure 4:
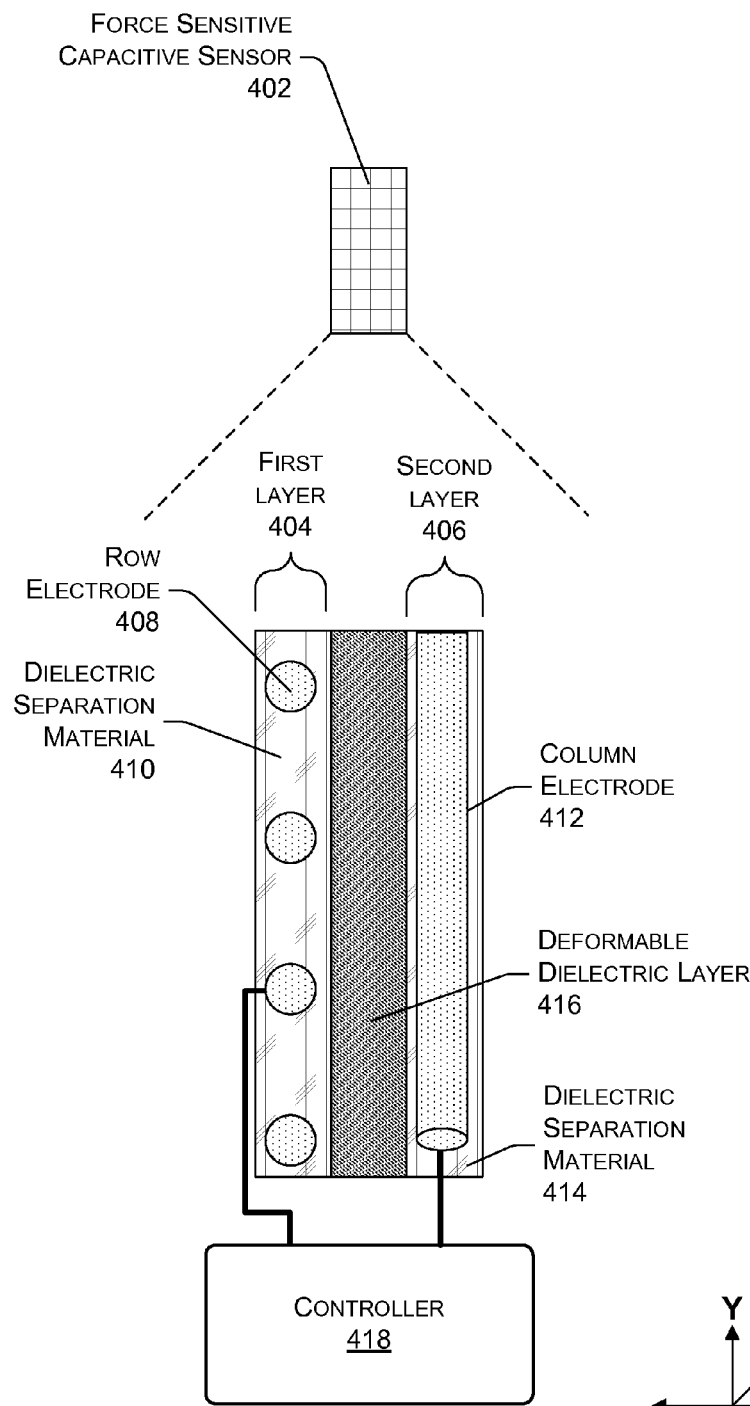
FIG. 4 illustrates a side view of the force sensitive capacitive sensor and a touch controller of the electronic device of FIG. 1 according to an embodiment of the present invention.

FIG. 4 illustrates an example schematic diagram 400 of an example force sensitive capacitive sensor 402 according to this disclosure and the operation thereof. As mentioned above, the force sensitive sensor 402 may share a touch controller with the conventional capacitive touch sensor. Operation of the touch controller is described following the description of the components of the force sensitive sensor 402.

As illustrated in FIG. 4, the force sensor 402 includes a first layer 404 and a second layer 406 in which electrodes of the force sensor 402 are formed. In particular, the first layer 404 includes row electrodes 408 separated by a dielectric separation material 410 and the second layer 406 includes columns electrodes 412 separated by a dielectric separation material 414. The force sensor 402 also includes a deformable dielectric layer 416 disposed between the first layer 404 and the second layer 406. Depending on the implementation, the dielectric separation materials 410 and 414 may comprise deformable or non-deformable dielectric materials.

The sensor 402 is connected to a controller 418 such that the controller 418 is coupled to the electrodes 408 and 410 and able to pulse (e.g., apply power to) the row electrodes 408 in sequence and read changes in capacitance from the column electrodes 412 as each row electrode 408 is pulsed. Though only one set of leads is shown from the controller 418 to one row electrode and to one column electrode, one of ordinary skill in the art would understand this is for ease of illustration and that each row electrode and column electrode would be electrically connected to the controller 418.

As discussed above, as a touch input is received by the force sensitive capacitive force sensor 402, the deformable dielectric layer 416 compresses, reducing the distance between the row electrodes 408 and the column electrodes 412 at the location of the touch. As the distance is reduced and each row electrode 408 in the touched area is pulsed by the controller 418, the controller 418 detects changes in capacitance in the column electrodes 412 intersecting the touched area. As the controller 418 is aware of the row electrode being pulsed and the amount of change in capacitance detected at the column electrodes 412, the controller 418 may determine the amount of compression of the deformable dielectric layer 416 and/or the force applied to the sensor at each affected intersection.

For example, in the force sensing area, the mutual capacitance between transmit (pulsed) electrodes and the receive (scanned) electrodes may be determined as:

$$\text{Mutual capcitance} = (\varepsilon_0 * \varepsilon_r) * \frac{A}{d}$$

where $\varepsilon_0$ is the permittivity of free space; $\varepsilon_r$ is the dielectric constant of the deformable dielectric material; A is the cross sectional area of the transmit and receive electrodes; and d is the vertical separation between the transmit and receive electrodes including adhesive thickness and deformable layer thickness. As a user applies pressure, d is reduced and the mutual capacitance increases. Similarly, in the touch sensing area, the mutual capacitance between transmit (or pulsed) electrodes and the receive (or scanned) electrodes may be determined as:

$$\text{Capacitance}_{Mutual} = (\varepsilon_0 * \varepsilon_r) * \frac{A}{d} + \text{Capacitance}_{Fringe\ Field}$$

Because the separating material is non-deformable in the touch sensing area, the first part of the equation remains constant as the user causes proximity effects and touches screen. On the other hand, the capacitance due to fringe field reduces as the user's finger (or other capacitive object) steals charge away from the transmit electrode.

As mentioned above, the controller 418 may be shared between the force sensitive capacitive force sensor 402 and a conventional capacitive touch sensor such as touch sensor 112. For example, the row electrodes of both sensors 402 and 112 may be pulsed in turn and, depending on the particular implementation, the column electrodes known to intersect the pulsed row electrode may be read. In particular, in implementations that share column electrodes between the sensors, the same column electrodes may be read by the controller 418 regardless of the row pulsed. On the other hand, in implementations in which separate column electrodes are included in each sensor, the controller 418 may read capacitance changes from column electrodes that intersect the pulsed row electrode (i.e., column electrodes that are included in the same sensor as the pulsed row electrode).

Figure 5:
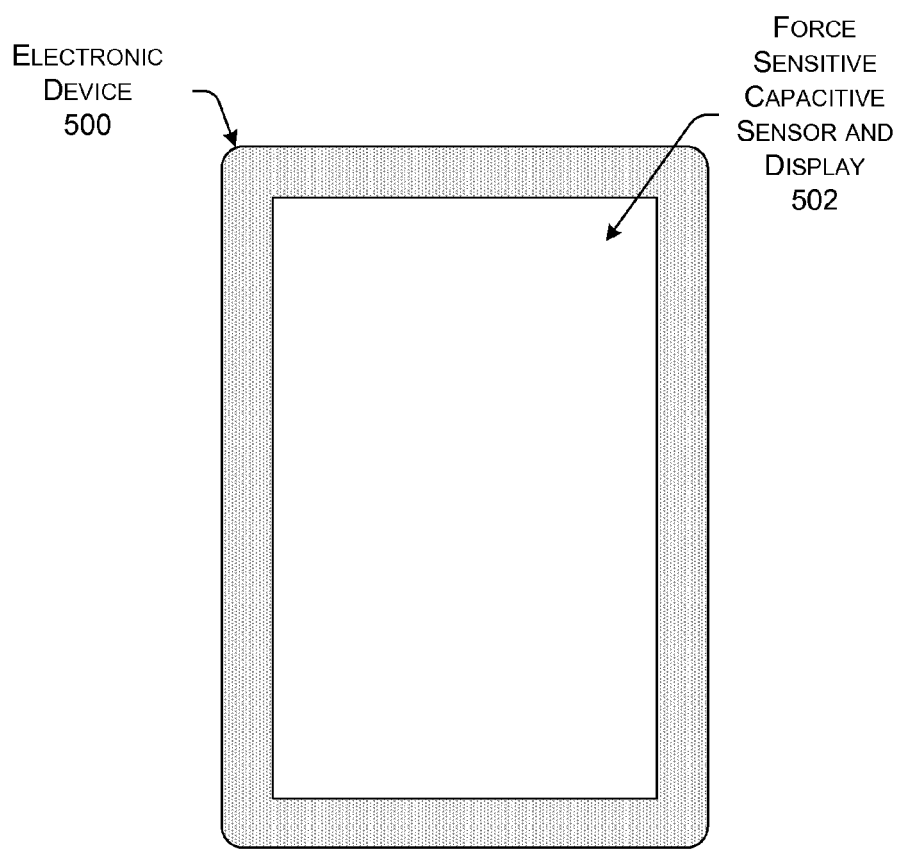
FIG. 5 illustrates an example electronic device equipped with a force sensitive capacitive sensor according to an embodiment of the present invention.
Figure 5:
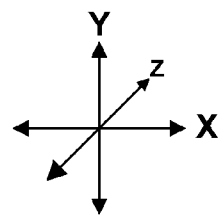

FIG. 5 illustrates an example electronic device 500 that includes an alternative touch sensor assembly. In particular, the electronic device 500 is an example implementation according to this disclosure that includes the force sensitive capacitive sensor in the display area 502 rather than having the conventional touch sensor of device 100 previously discussed in the display area 502. The device 500 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). More details of electronic device 500 are provided with regard to the description of FIG. 6.

Figure 6:
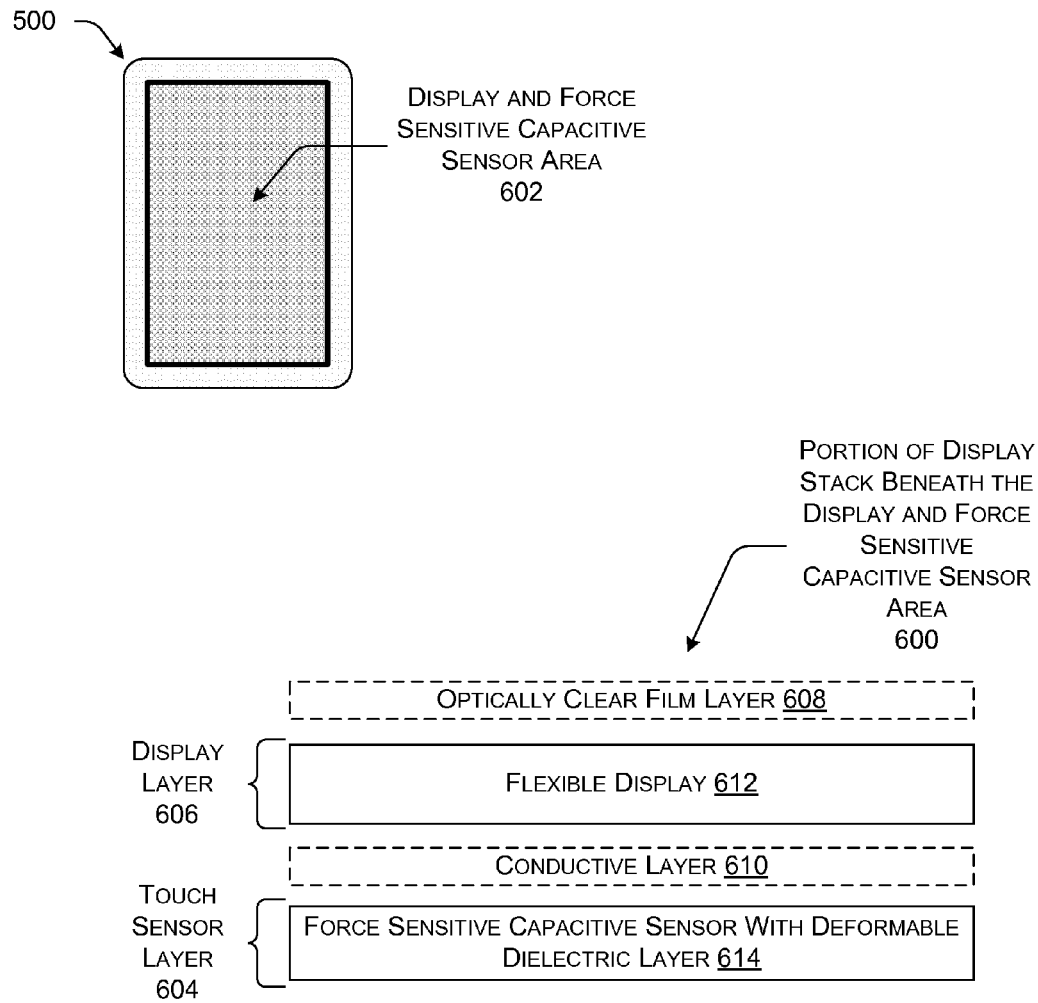
FIG. 6 illustrates an example schematic cross-section of a portion of a stack including the force sensitive and display area of the electronic device of FIG. 5 according to an embodiment of the present invention.
Figure 6:
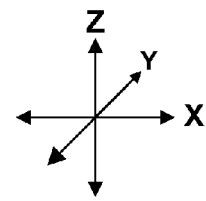

FIG. 6 illustrates an example of a schematic cross-section of the portion of the stack corresponding to the display area 602 of the electronic device 500. The illustrated example implementation includes a sensor layer 604, a display layer 606, an optically clear film layer 608 and a conductive layer 610.

As shown in FIG. 6, the cross-section 602 illustrates one implementation in which the one or more optically clear film layers 608 reside atop a flexible display 612 (e.g., an OLED display), which resides atop the conductive layer 610, which in turn resides atop a force sensitive capacitive sensor with a deformable dielectric layer 614 such as that illustrated in FIGS. 3A-3D and 4.

The optically clear film layer 608 may be a top surface layer to which touches are applied. For example, the optically clear film layer 608 may include, among other components, a cover glass and an antiglare film. Further, while illustrated as including optically clear film layer 608 and the conductive layer 610, the stack illustrated in FIG. 6 may not include these components in some implementations. For example, the conductive layer 610 may not be included. For example, in some implementations in which the flexible display 612 includes a solid ground plane, the solid ground plane may operate to shield against proximity effects and thus serves as the conductive layer.

In operation, touches to the top surface of the display stack represented by the cross-section 602 may cause the flexible display 612 to flex and transmit the force to the force sensor 614. In other words, when force is applied to the flexible display 612 surface, the display bends and causes the back surface of the display to push on the sensor at that location and the sensor registers an input. In turn, the deformable layer of the sensor 614 may compress and the touch may be detected as discussed above with regard to FIG. 5.

The systems and devices described above and illustrated in FIGS. 1-6 are merely examples and as such implementations are not limited these examples. For example, while FIGS. 2-4 and 6 illustrate example display stacks, other implementations may utilize the same or different components in the same or different orders.

In other example variations, the electrodes of the force sensor may be formed on the same substrate and/or may not include a conductive layer between the force sensor and the touch surface. In a particular example, the electrodes 408 and 412 of layers 404 and 406 may be formed on the same flexible substrate. The deformable dielectric layer 416 may be placed over one set of electrodes and the flexible substrate may be folded to form a force sensor as disclosed herein.

In a variation in which the conductive material is not be included between the force sensor and the touch surface, the pulsed or transmit electrodes of the force sensor may be positioned in the layer proximate the touch surface and configured with minimal separation between the transmit electrodes. For example, the separation may be minimized by configuring the transmit electrodes to be wide enough to nearly fill the area of the plane in which the transmit electrodes reside. By configuring the transmit electrodes to have minimal separation, the proximity effects from a user's finger or other object applying force to the touch surface on the capacitance detected at the receive electrodes in the other layer of the force sensor may be minimized. In some implementations that also include a touch sensor, the receive electrodes of the touch sensor may be on the side of the touch sensor proximate to the touch surface (i.e., on the same side as the transmit electrodes of the force sensor). This may allow for proximity effects to be detected for the touch sensor electrodes while minimizing the impact of proximity effects on the force sensor electrodes.

These and other features, variations and/or components would be apparent to one of ordinary skill in the art in view of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising:
   one or more processors;
   memory coupled to the one or more processors and storing at least one content item;
   a display configured to display the content item;
   a first layer comprising a first continuous substrate, the first continuous substrate including:
      a plurality of first force sensor electrodes arranged in columns and formed in a first portion of the first continuous substrate; and
      a plurality of first touch sensor electrodes arranged in columns and formed in a second portion of the first continuous substrate;
   a second layer disposed above the first layer and comprising a second continuous substrate, the second continuous substrate including:
      a plurality of second force sensor electrodes arranged in rows and formed in a first portion of the second continuous substrate; and
      a plurality of second touch sensor electrodes arranged in rows and formed in a second portion of the second continuous substrate;
   a third layer disposed between the first layer and the second layer and comprising a continuous solid dielectric layer, the continuous solid dielectric layer including:
      a first portion of deformable dielectric material disposed between the plurality of first force sensor electrodes of the first layer and the plurality of second force sensor electrodes of the second layer; and
      a second portion of non-deformable dielectric material disposed between the plurality of first touch sensor electrodes of the first layer and the plurality of second touch sensor electrodes of the second layer, wherein at least a section of the second portion of non-deformable dielectric material is directly adjacent at least a section of the first portion of deformable dielectric material; and
   wherein the first touch sensor electrodes and the second touch sensor electrodes are disposed above the display.

2. An electronic device as recited in claim 1, wherein the plurality of first force sensor electrodes and the plurality of second force sensor electrodes are disposed at a periphery of the display.

3. An electronic device as recited in claim 1, wherein the plurality of first force sensor electrodes, the first portion of deformable dielectric material, and the plurality of second force sensor electrodes comprise a force sensor, and wherein the force sensor detects a capacitance change between at least one electrode of the plurality of first force sensor electrodes and at least one electrode of the plurality of second force sensor electrodes resulting from deformation of the first portion of deformable dielectric material.

4. An electronic device as recited in claim 1, wherein the plurality of first touch sensor electrodes, the second portion of non-deformable dielectric material, and the plurality of second touch sensor electrodes comprise a touch sensor, the electronic device further comprising a cover glass disposed over the touch sensor, wherein the touch sensor detects capacitance changes between at least one electrode of the plurality of first touch sensor electrodes and at least one electrode of the plurality of second touch sensor electrodes caused by an object touching the cover glass.

5. An electronic device as recited in claim 1, further comprising a stack that includes a force sensor comprising the plurality of first force sensor electrodes, the first portion of deformable dielectric material, and the plurality of second force sensor electrodes and a conductive material, wherein the conductive material is disposed between the force sensor and a touch surface.

6. The electronic device of claim 1, wherein the plurality of second force sensor electrodes arranged in rows are disposed above the plurality of first force sensor electrodes arranged in columns such that the plurality of second force sensor electrodes and the plurality of first force sensor electrodes define a grid pattern of electrodes.

7. An electronic device comprising:
a display configured to display content;
a first layer comprising a first continuous substrate, the first continuous substrate comprising:
 a plurality of first force sensor electrodes arranged in columns and formed in a first portion of the first continuous substrate; and
 a plurality of first touch sensor electrodes arranged in columns and formed in a second portion of the first continuous substrate;
a second layer disposed above the first layer and comprising a second continuous substrate, the second continuous substrate comprising:
 a plurality of second force sensor electrodes arranged in rows and formed in a first portion of the second continuous substrate; and
 a plurality of second touch sensor electrodes arranged in rows and formed in a second portion of the second continuous substrate; and
a third layer disposed between the first layer and the second layer and comprising a continuous solid dielectric layer, the continuous solid dielectric layer including:
 a first portion of deformable dielectric material disposed between the plurality of first force sensor electrodes of the first layer and the plurality of second force sensor electrodes of the second layer, wherein the plurality of first force sensor electrodes, the first portion of deformable dielectric material, and the plurality of second force sensor electrodes comprise a force sensor; and
 a second portion of non-deformable dielectric material disposed between the plurality of first touch sensor electrodes of the first layer and the plurality of second touch sensor electrodes of the second layer, wherein the plurality of first touch sensor electrodes, the second portion of non-deformable dielectric material, and the plurality of second touch sensor electrodes comprise a touch sensor, wherein at least a section of the second portion of non-deformable material is directly adjacent at least a section of the first portion of deformable dielectric material.

8. An electronic device as recited in claim 7, further comprising a touch controller coupled to the force sensor; wherein the touch controller is configured to detect a force applied to a touch surface based at least in part on a change in capacitance between at least one electrode of plurality of first force sensor electrodes and at least one electrode of the plurality of second force sensor electrodes resulting from deformation of the first portion of deformable dielectric material.

9. An electronic device as recited in claim 7, further comprising a touch controller coupled to the force sensor, wherein electrodes of the plurality of first force sensor electrodes are pulsed by the touch controller and an output of the electrodes of the plurality of second force sensor electrodes is monitored by the touch controller to determine changes in capacitance, wherein the electrodes of the plurality of first force sensor electrodes that are pulsed by the touch controller are positioned closer to a touch surface than the electrodes of the plurality of second force sensor electrodes monitored by the touch controller.

10. An electronic device as recited in claim 7, wherein the force sensor and the touch sensor are in a same layer of a display stack of the electronic device.

11. An electronic device as recited in claim 7, further comprising a controller operatively coupled to at least one electrode of the plurality of first force sensor electrodes, at least one electrode of the plurality of second force sensor electrodes, at least one electrode of the plurality of first touch sensor electrodes, and at least one electrode of the plurality of second touch sensor electrodes.

12. An electronic device as recited in claim 11, wherein the controller is configured to:
 detect capacitance changes between the at least one electrode of the plurality of first force sensor electrodes and the at least one electrode of the plurality of second force sensor electrodes resulting from deformation of the first portion of deformable dielectric material separating the plurality of first force sensor electrodes and the plurality of second force sensor electrodes; and
 detect capacitance changes between the at least one electrode of the plurality of first touch sensor electrodes and the at least one electrode of the plurality of second touch sensor electrodes caused by electromagnetic interactions with an object that touches a top surface of a component stack of the electronic device.

13. An electronic device as recited in claim 7, further comprising:
 a touch controller coupled to the force sensor,
 wherein the touch controller is configured to pulse electrodes of the plurality of first force sensor electrodes and electrodes of the plurality of first touch sensor electrodes and to monitor electrodes of the plurality of second force sensor electrodes and electrodes of the plurality of second touch sensor electrodes to determine changes in capacitance, and
 wherein the electrodes of the plurality of first force sensor electrodes are positioned closer to a touch surface than the electrodes of the plurality of second force sensor electrodes and the electrodes of the plurality of first touch sensor electrodes are positioned closer to a touch surface than the electrodes of the plurality of second touch sensor electrodes.

14. An electronic device as recited in claim 13, wherein a separation between the electrodes of the plurality of first force sensor electrodes reduces proximity effects detected by the touch controller for the force sensor in comparison to a separation between the electrodes of the plurality of first touch sensor electrodes of the touch sensor.

15. The electronic device of claim 7, wherein the touch sensor, the force sensor, and the display each comprise a top surface, a bottom surface, and a border formed between the top surface and bottom surface;
 wherein the touch sensor is disposed above the display such that the bottom surface of the touch sensor faces the top surface of the display, and the border of the touch sensor defines a common border with the border of the display; and
 wherein the force sensor is disposed adjacent the display such that the border of the force sensor abuts at least a portion of the common border.

16. The electronic device of claim 7, further comprising a fourth continuous layer disposed above the second layer, the fourth continuous layer comprising:

a first portion comprising conductive material disposed above the plurality of second force sensor electrodes; and a second portion comprising a cover glass disposed above the plurality of second touch sensor electrodes.

17. The electronic device of claim 16, further comprising a fifth continuous layer disposed below the first layer, the fifth continuous layer comprising:

a third portion comprising conducting material disposed below the plurality of first force sensor electrodes; and a fourth portion comprising an optically clear separating material disposed below the first touch sensor electrodes, wherein the display is disposed below the fourth portion comprising the optically clear separating material.

18. A method for assembling at least a portion of an electronic device, the method comprising:

providing a first continuous substrate and a second continuous substrate;

forming, in a first portion of the first continuous substrate, a plurality of first touch sensor electrodes;

forming, in a second portion of the first continuous substrate, a plurality of first force sensor electrodes;

forming, in a first portion of the second continuous substrate, a plurality of second touch sensor electrodes;

forming, in a second portion of the second continuous substrate, a plurality of second force sensor electrodes;

forming a first portion of a continuous solid dielectric layer over the plurality of second force sensor electrodes, the first portion of the continuous solid dielectric layer including a deformable dielectric material;

forming a second portion of the continuous solid dielectric layer over the plurality of second touch sensor electrodes, the second portion of the continuous solid dielectric layer including a non-deformable dielectric material, wherein at least a section of the non-deformable dielectric material is formed directly adjacent at least a section of the deformable dielectric material; and joining the first continuous substrate to the second continuous substrate such that the continuous solid dielectric layer is disposed between the first continuous substrate and the second continuous substrate, the first portion of the continuous solid dielectric layer including the deformable dielectric material disposed between the plurality of first force sensor electrodes and the plurality of second force sensor electrodes, the second portion of the continuous solid dielectric layer including the non-deformable dielectric material being disposed between the plurality of first touch sensor electrodes and the plurality of second touch sensor electrodes.

19. A method as recited in claim 18, further comprising:

joining one of the first continuous substrate or the second continuous substrate to one or more other layers including a layer comprising a conductive material, wherein the conductive material is configured to negate capacitive effects between an object near or touching a touch surface of the electronic device and the plurality of first force sensor electrodes and the plurality of second force sensor electrodes.

20. A method as recited in claim 18, further comprising:

operatively coupling a controller to the plurality of first force sensor electrodes and the plurality of second force sensor electrodes, wherein the controller is configured to pulse the plurality of first force sensor electrodes and monitor the plurality of second force sensor electrodes to detect a change in capacitance;

wherein the plurality of first force sensor electrodes are positioned closer to a touch surface than the plurality of second force sensor electrodes.

* * * * *